Oct. 2, 1951   J. S. BURGE ET AL   2,569,513
MACHINE FOR TAPING ELECTRICAL COILS
Original Filed March 11, 1947   18 Sheets-Sheet 1

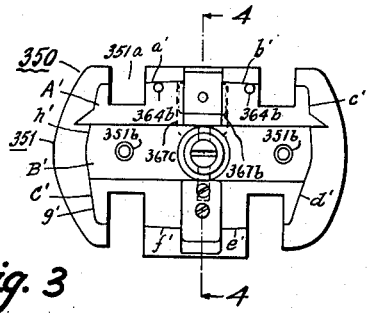
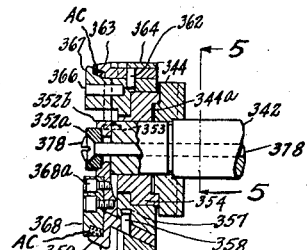
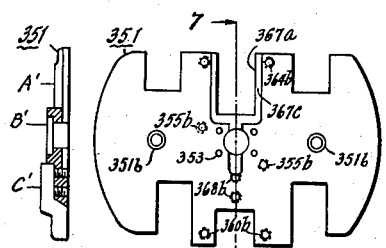
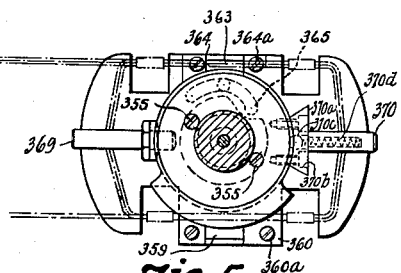
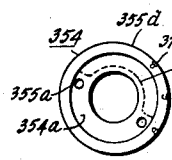
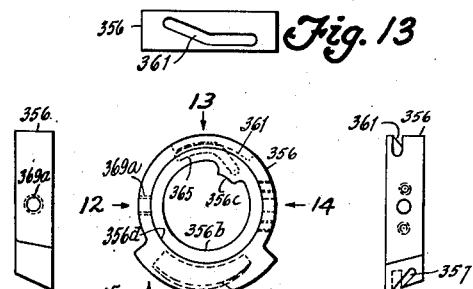
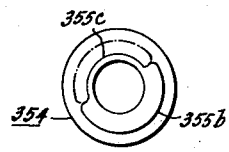

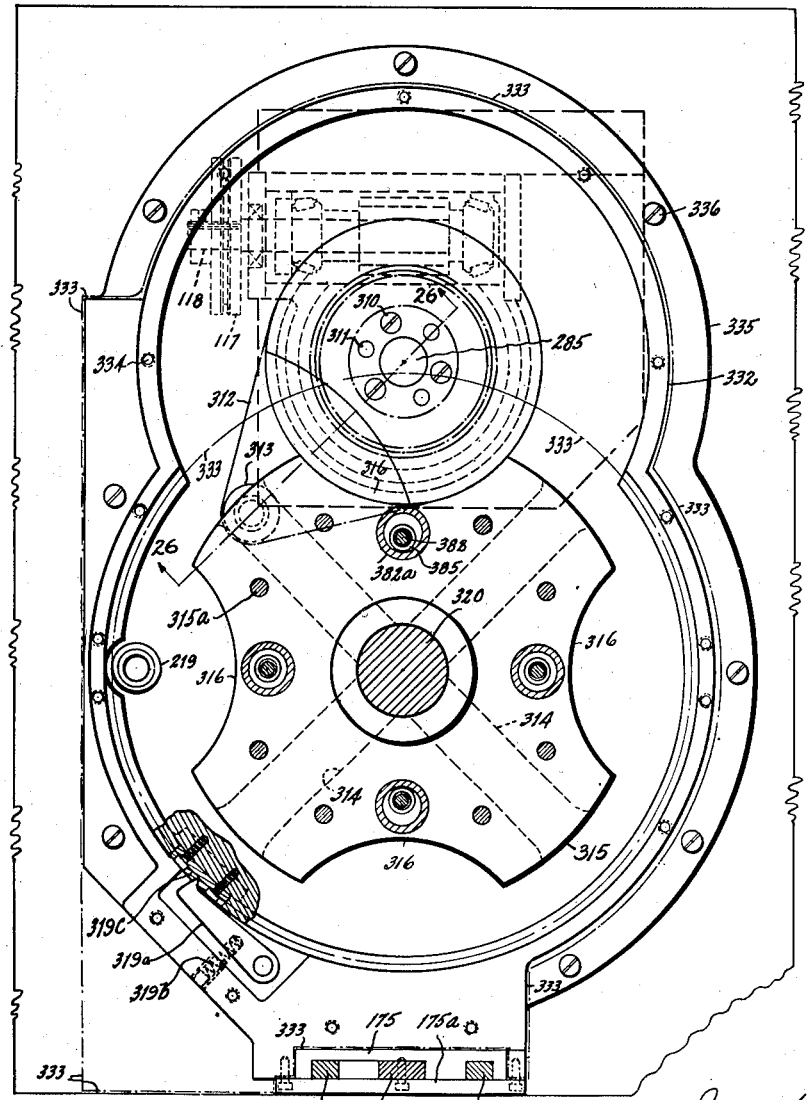

Oct. 2, 1951  J. S. BURGE ET AL  2,569,513
MACHINE FOR TAPING ELECTRICAL COILS
Original Filed March 11, 1947  18 Sheets-Sheet 6
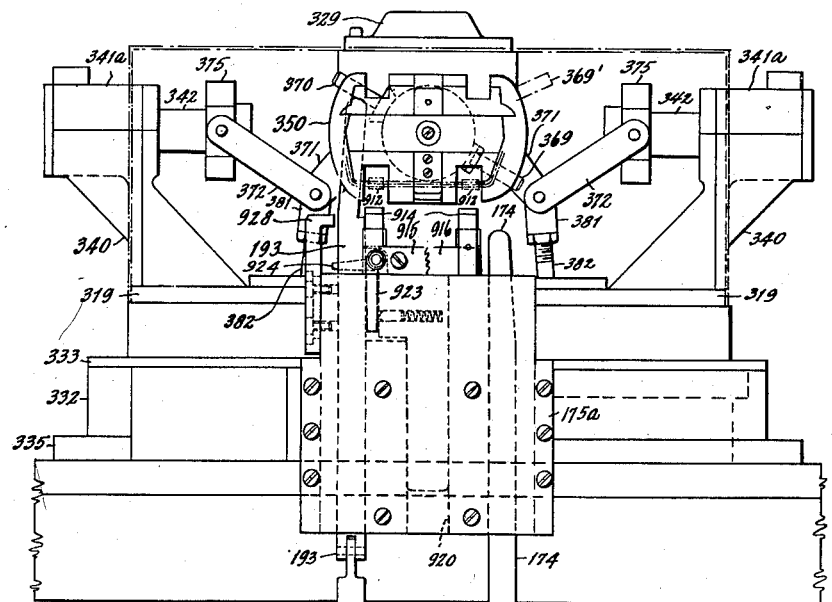
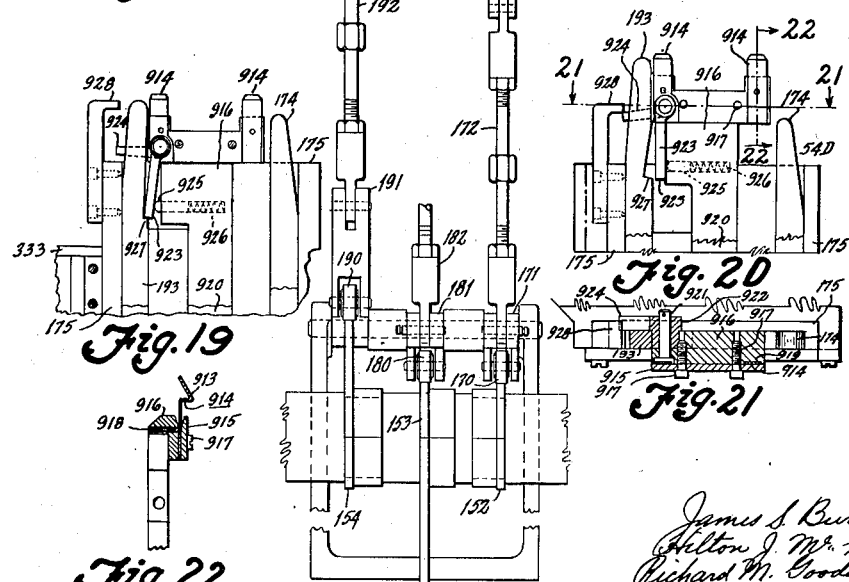
James S. Burge
Hilton J. McKee
Richard M. Goodwin
INVENTORS
BY Spencer Hardman & Feber
their ATTORNEYS

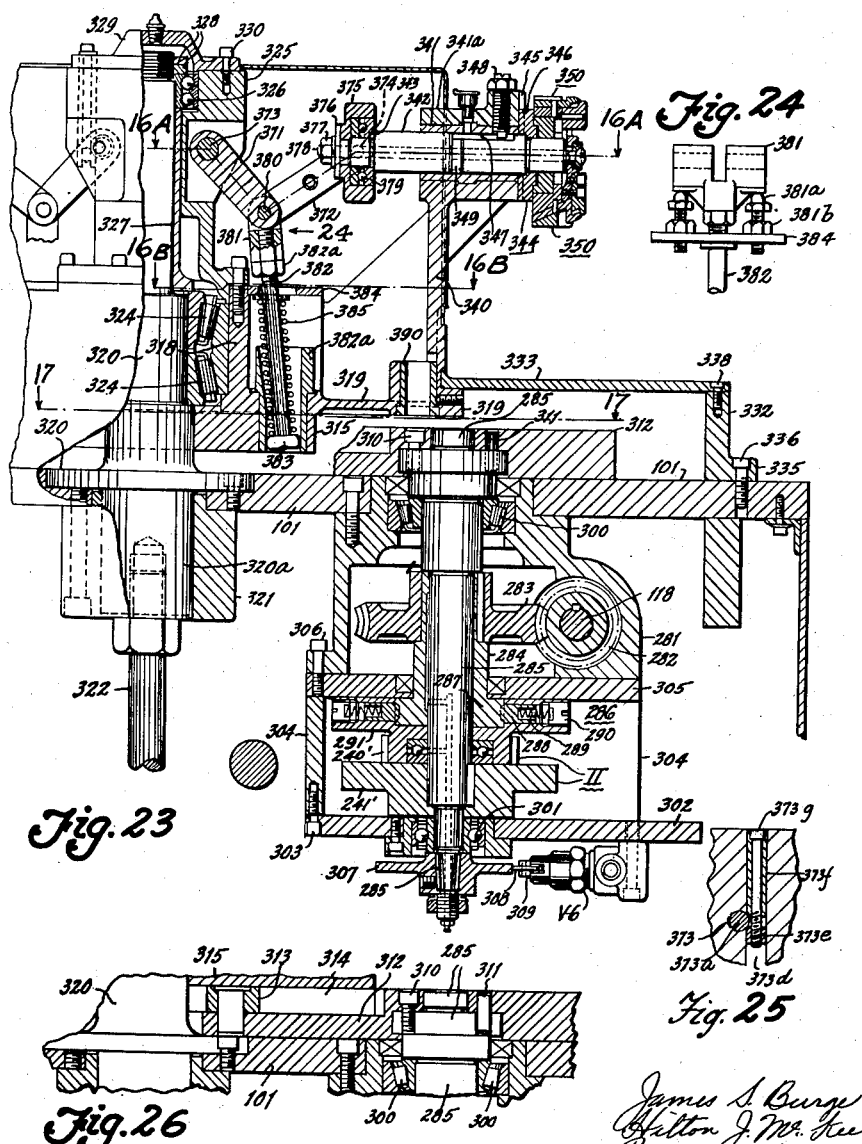

Oct. 2, 1951     J. S. BURGE ET AL     2,569,513
MACHINE FOR TAPING ELECTRICAL COILS
Original Filed March 11, 1947     18 Sheets-Sheet 8

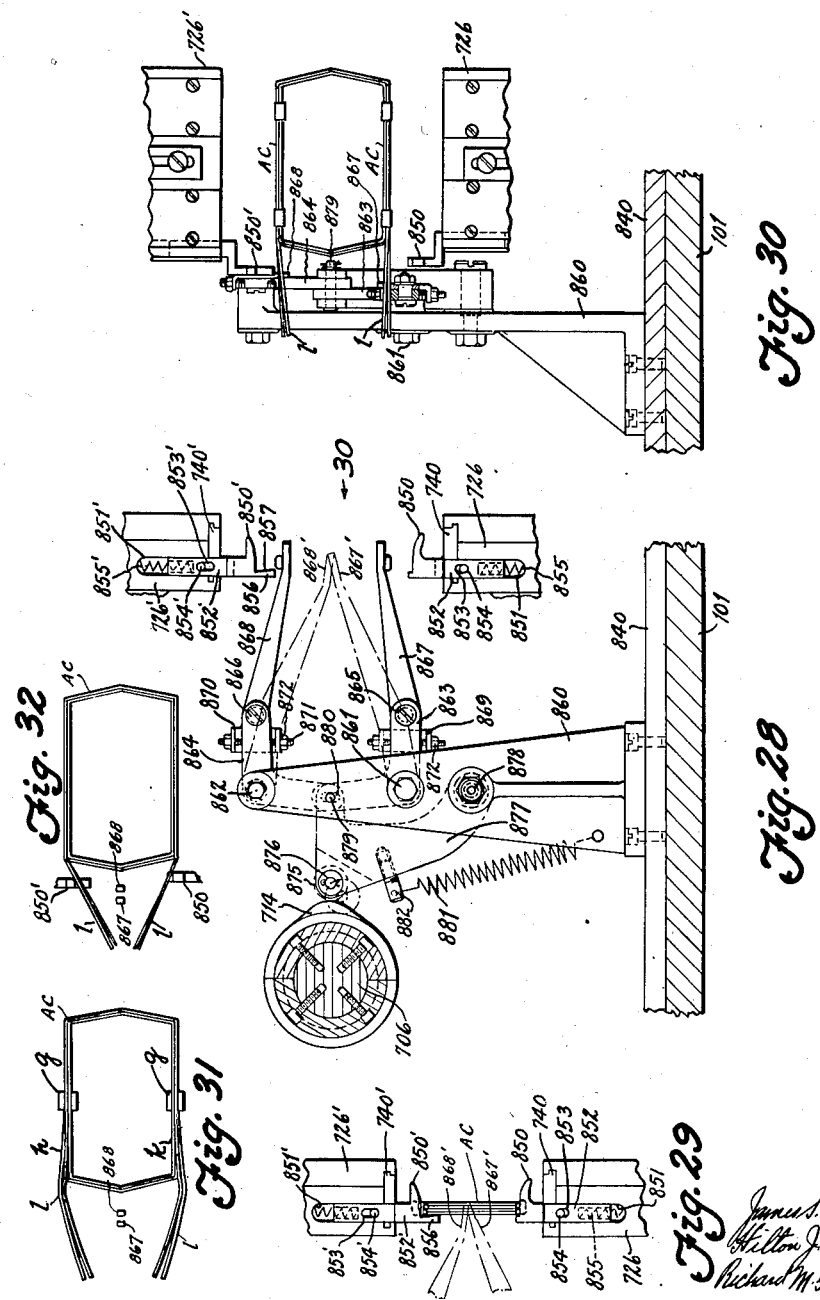

Oct. 2, 1951 J. S. BURGE ET AL 2,569,513
MACHINE FOR TAPING ELECTRICAL COILS
Original Filed March 11, 1947 18 Sheets-Sheet 11

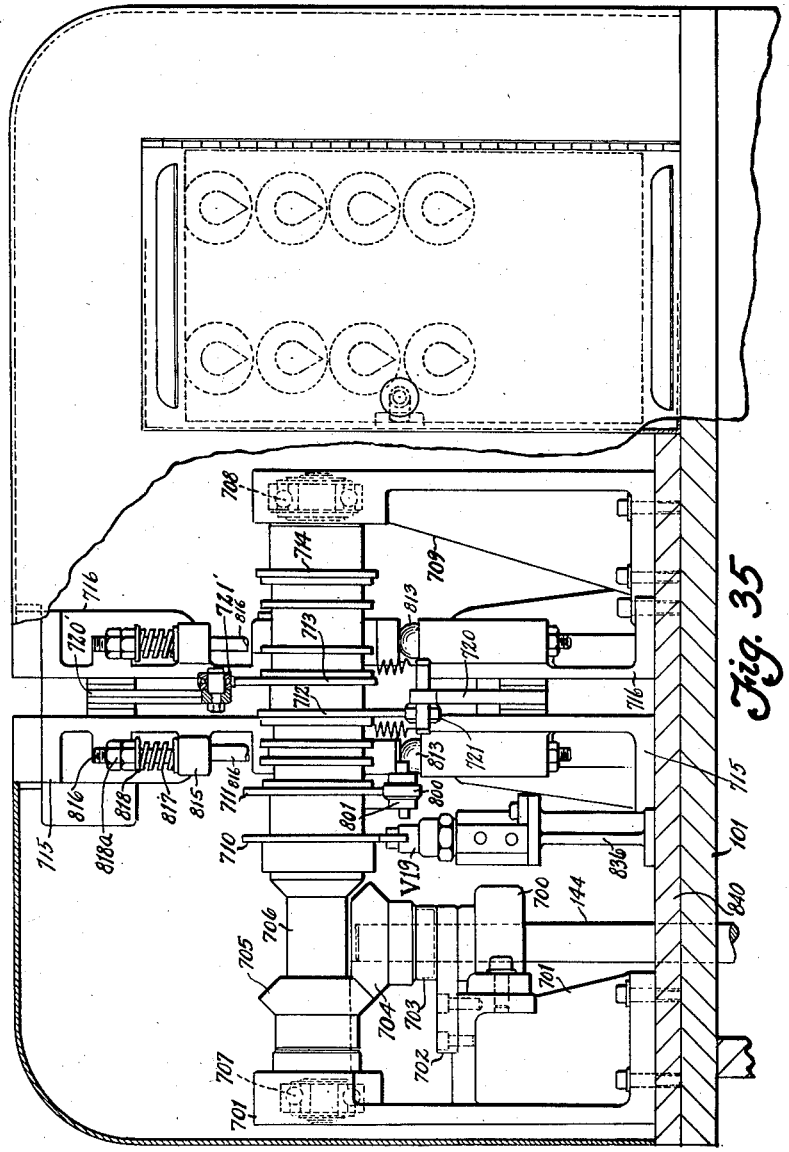

Oct. 2, 1951  J. S. BURGE ET AL  2,569,513
MACHINE FOR TAPING ELECTRICAL COILS
Original Filed March 11, 1947  18 Sheets-Sheet 13
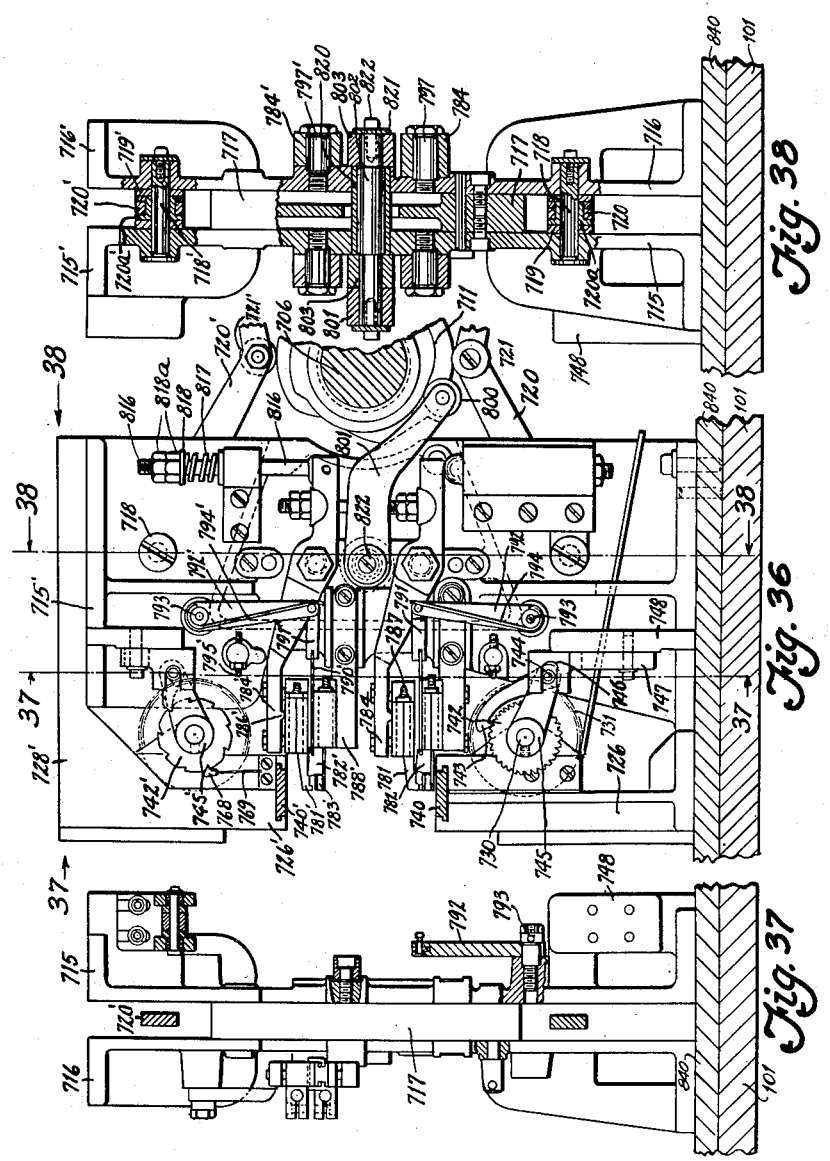
James S. Burge
Hilton J. McKee
Richard M. Goodwin
INVENTORS
BY Spencer Hardman Feler
their ATTORNEYS Oct. 2, 1951 J. S. BURGE ET AL 2,569,513
MACHINE FOR TAPING ELECTRICAL COILS
Original Filed March 11, 1947 18 Sheets-Sheet 14
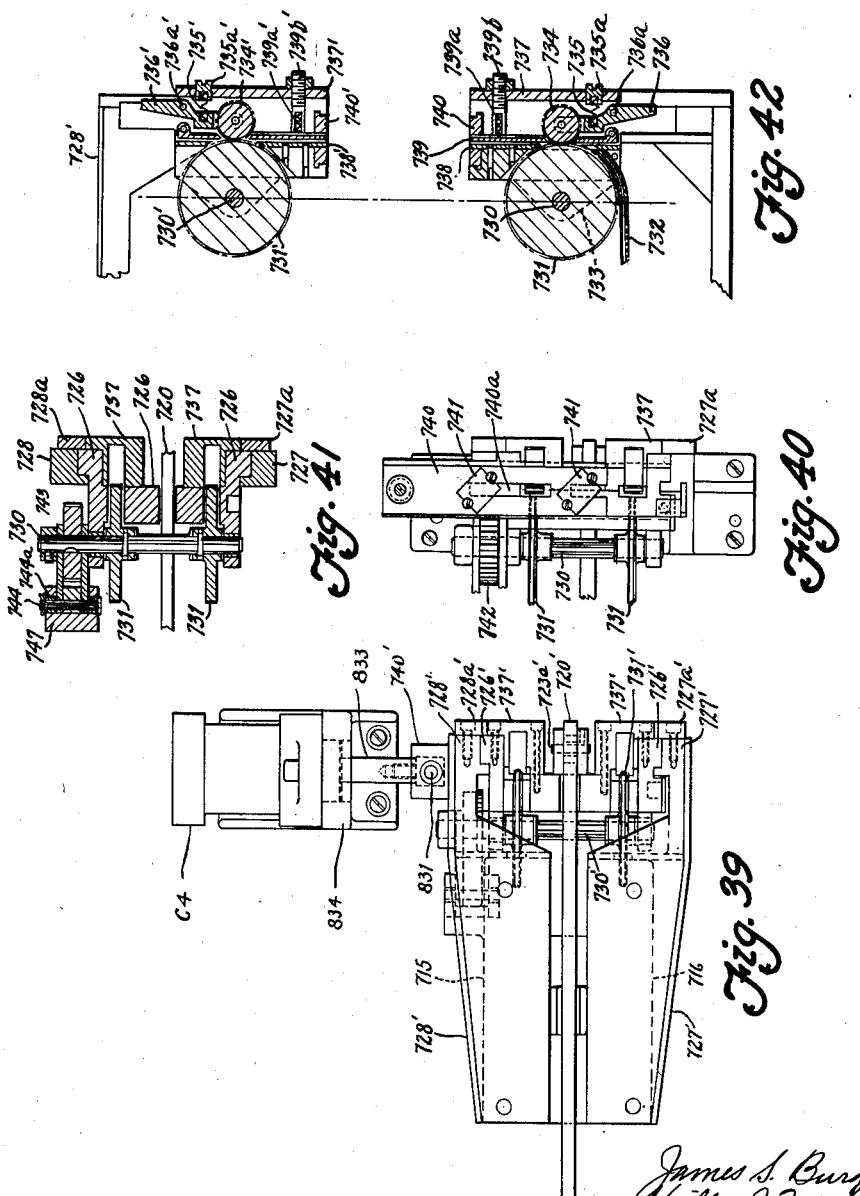

Oct. 2, 1951     J. S. BURGE ET AL     2,569,513

MACHINE FOR TAPING ELECTRICAL COILS

Original Filed March 11, 1947     18 Sheets-Sheet 15

James S. Burge
Hilton J. McKee
Richard M. Goodwin
INVENTORS

BY Spencer Hardman & Felix
their ATTORNEYS

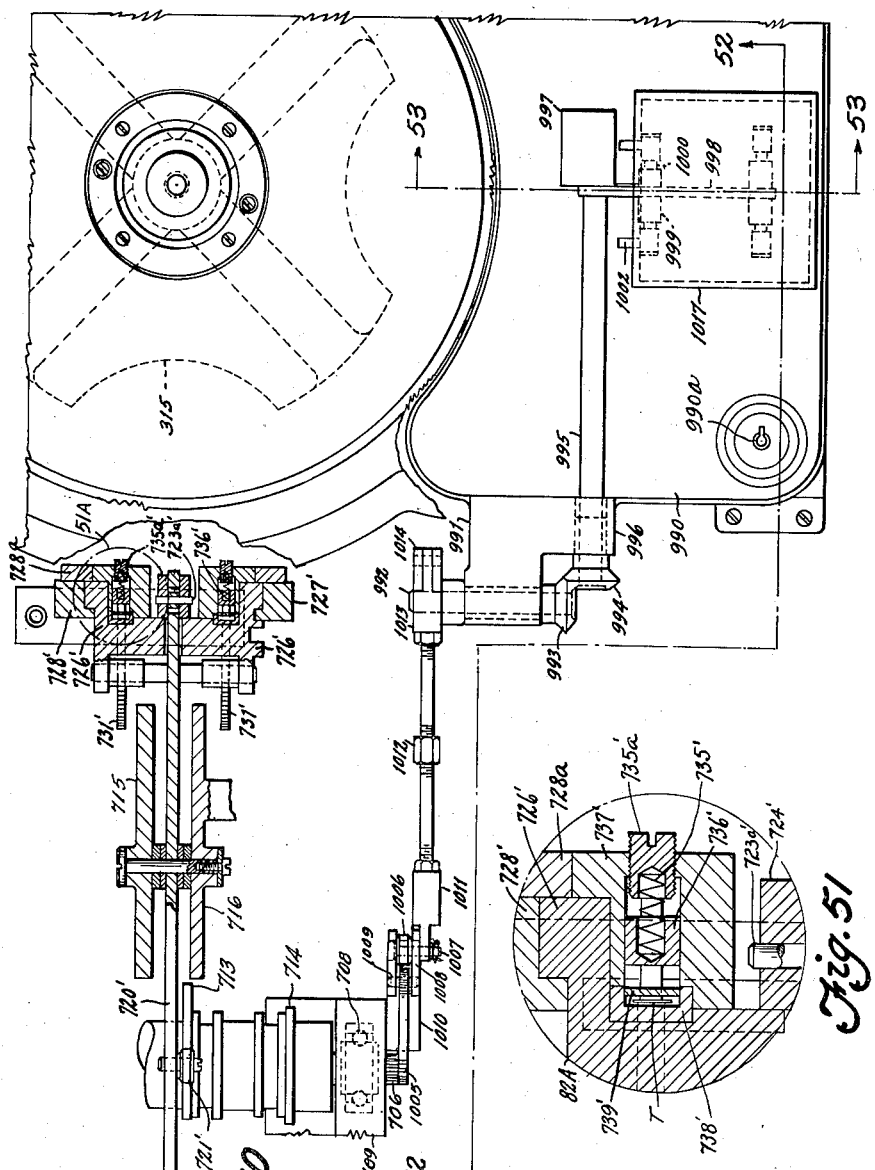

Oct. 2, 1951  J. S. BURGE ET AL  2,569,513
MACHINE FOR TAPING ELECTRICAL COILS
Original Filed March 11, 1947  18 Sheets-Sheet 17
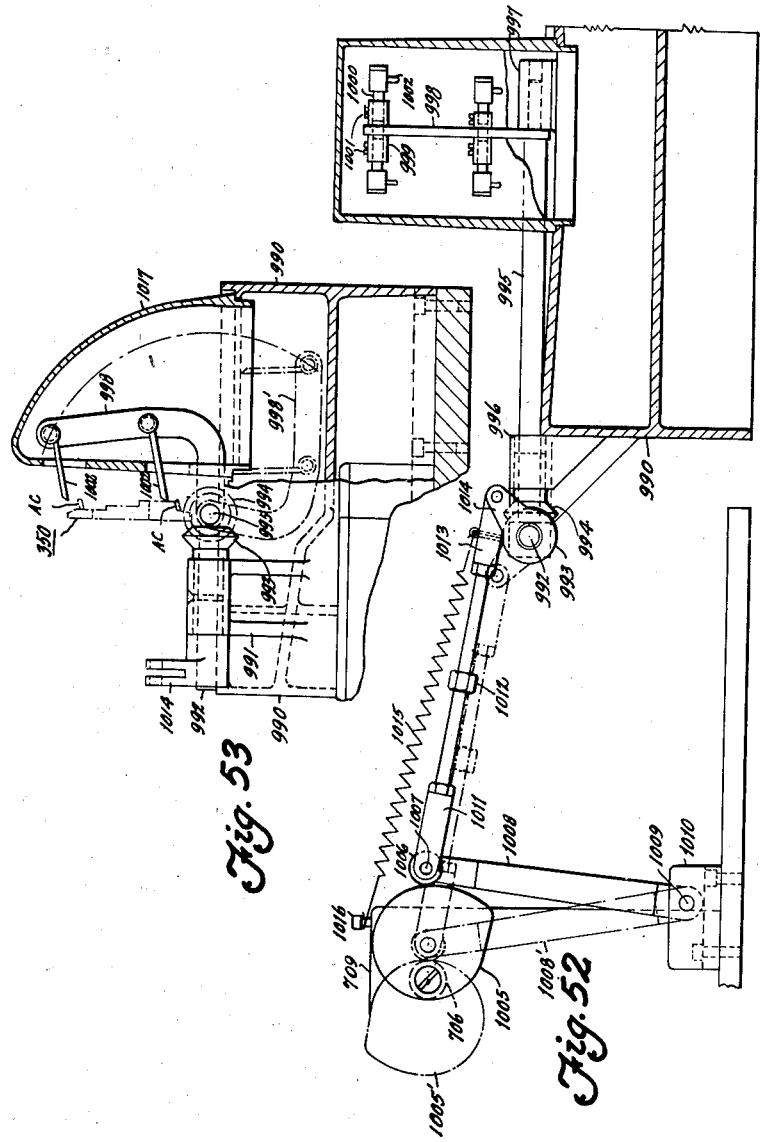
James S. Burge
Hilton J. McKee
Richard M. Goodwin
INVENTORS
BY Spencer Hardman & Fehr
their ATTORNEYS Oct. 2, 1951      J. S. BURGE ET AL      2,569,513
MACHINE FOR TAPING ELECTRICAL COILS
Original Filed March 11, 1947      18 Sheets-Sheet 18
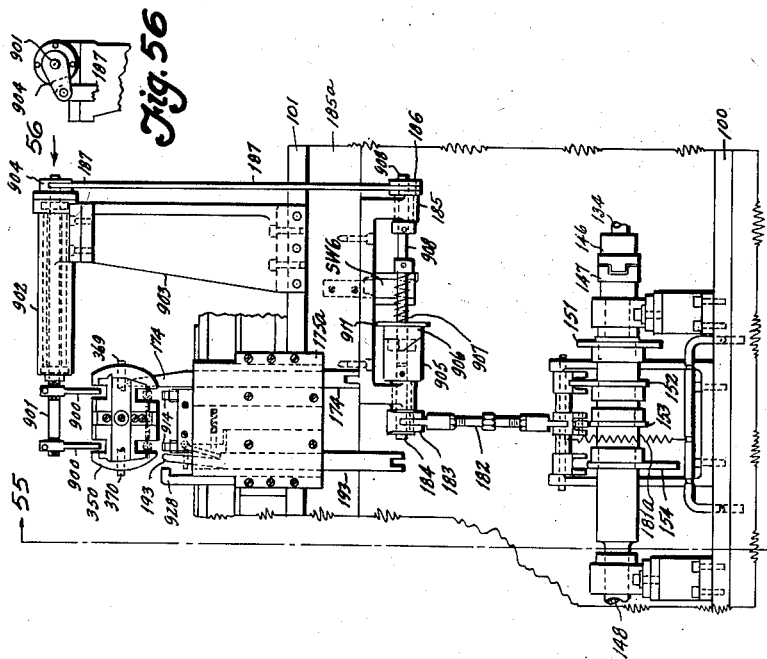
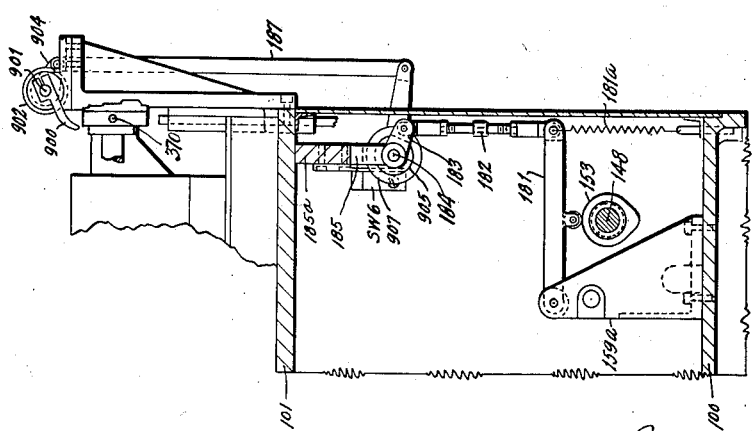

Patented Oct. 2, 1951

2,569,513

UNITED STATES PATENT OFFICE 2,569,513

MACHINE FOR TAPING ELECTRICAL COILS

James S. Burge, Anderson, Hilton J. McKee, Middletown, and Richard M. Goodwin, Anderson, Ind., assignors to General Motors Corporation, Detroit, Mich., a corporation of Delaware Original application March 11, 1947, Serial No. 733,758. Divided and this application October 29, 1948, Serial No. 57,162

14 Claims. (Cl. 216—25)

This invention relates to the manufacture of electric coils, for example, pre-wound armature coils to be assembled with the slotted armature core of a dynamo-electric-machine.

This application is a division of Serial No. 733,758, filed March 11, 1947.

An object of the invention is to provide an apparatus for taping a coil supported on a form which may be a form on which the coil is wound by a coil winding mechanism. In the disclosed embodiment of the invention, this object is accomplished by the use of a turret or dial carrying a plurality of form halves adapted to be placed successively in contact with a form half rotated by a winding mechanism provided by the machine which operates automatically to wind wire upon the contacting form halves. At the completion of winding, the wound coil is locked to the form half carried by the dial and said form half is retracted from the form half provided by the winding mechanism. The dial is indexed to carry the coil to a station where a liquid is applied to the portions of the coil which are to receive the tape. The dial is indexed to carry the coil to a station where the tape is applied, the sticking of the tape to the coil being facilitated by the liquid applied. At the taping station, the dial form carrying the coil is advanced toward tape applying members whose movements are coordinated with movements of the dial form in order to apply the tape to the coil. The dial form is retracted and the dial form is indexed to an ejection station when the coil is unlocked from its supporting form half; and an ejector causes the taped coil to gravitate upon a stacking rack. The empty form half is conditioned to receive the next coil to be wound thereon. Each indexing of the dial brings an empty form half to the winding station where it is in alignment with the form half of the winding mechanism and the aligned form halves are caused to engage; and the winding of wire thereon takes place while other coils carried by the dial are located respectively at the liquid-applying, tape-applying and ejecting stations.

Further objects and advantages of the present invention will be apparent from the following description, reference being had to the accompanying drawings, wherein a preferred embodiment of the present invention is clearly shown.

In the drawings:

Fig. 3 is a front view of the dial half of the winding head form.

Fig. 4 is a sectional view on line 4—4 of Fig. 3.

Fig. 5 is a sectional view on line 5—5 of Fig. 4.

Fig. 6 is a back view of the form frame.

Fig. 7 is a sectional view on line 7—7 of Fig. 6.

Fig. 8 is a view of a cam support included in the dial half of the winding form.

Fig. 9 is a side view thereof.

Fig. 10 is a view in the direction of arrow 10 of Fig. 9.

Fig. 11 is a back view of the cam supported by the part shown in Fig. 8.

Figs. 12, 13, 14 and 15 are side views looking respectively in the direction of arrows 12, 13, 14 and 15 of Fig. 20.

Figure 16:
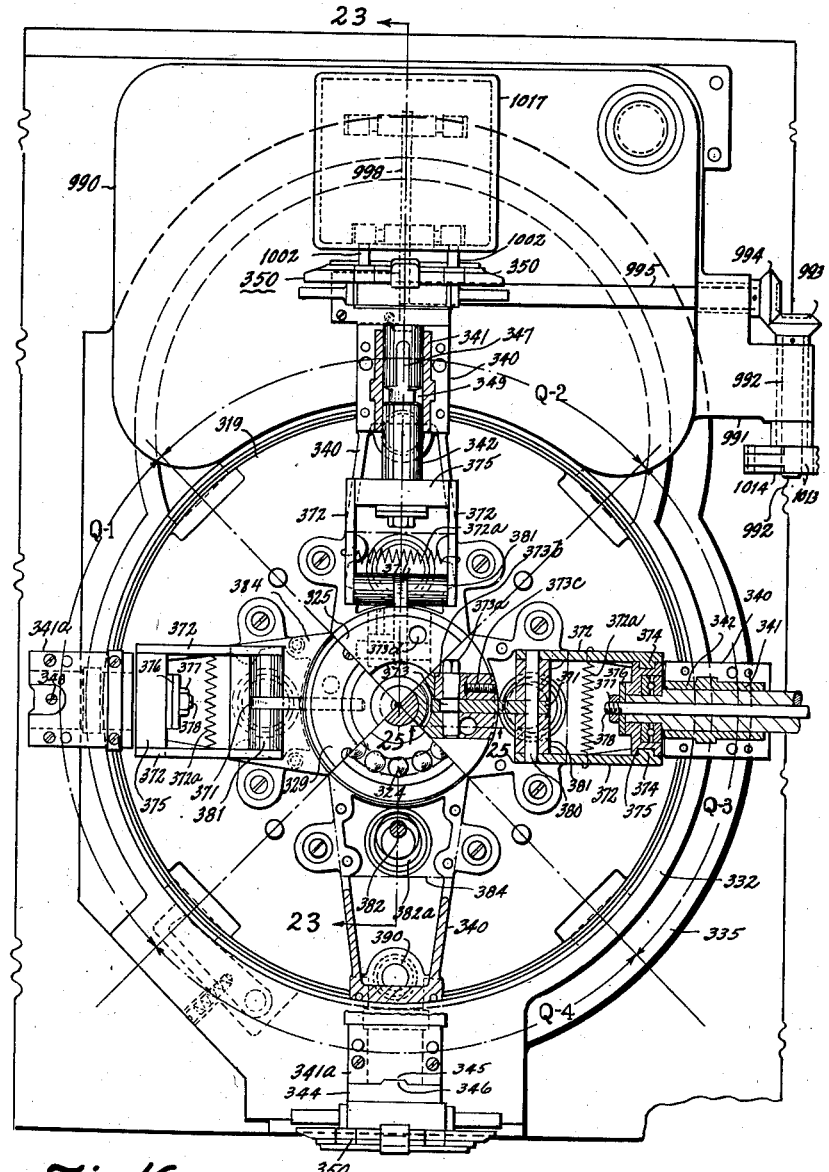

Fig. 16 is a plan view partly in section of the rotary dial or turret which carries four of the forms shown in Figs. 3 to 15. Quadrant Q1 shows a plan view. Quadrant Q2 shows the turret cap and form-bearing cover removed. Quadrant Q3 is a section on line 16—16 of Fig. 23. Quadrant Q4 is a section on line 16—16 of Fig. 23.

Fig. 17 is a sectional view on line 17—17 of Fig. 23.

Fig. 18 is a view in the direction of arrow 18 of Fig. 16.

Figs. 19 and 20 show fragments of a mechanism of Fig. 18 in different positions.

Figs. 21 and 22 are sectional views on lines 21—21 and 22—22 of Fig. 20.

Fig. 23 is a sectional view taken on line 23—23 of Fig. 16.

Fig. 24 is a fragmentary view in the direction of arrow 24 of Fig. 23.

Fig. 25 is a sectional view on line 25—25 of Fig. 16.

Fig. 26 is a fragmentary, sectional view on line 26—26 of Fig. 17 when the Geneva driving arm has been rotated 45° counterclockwise from the position shown.

Figure 27:
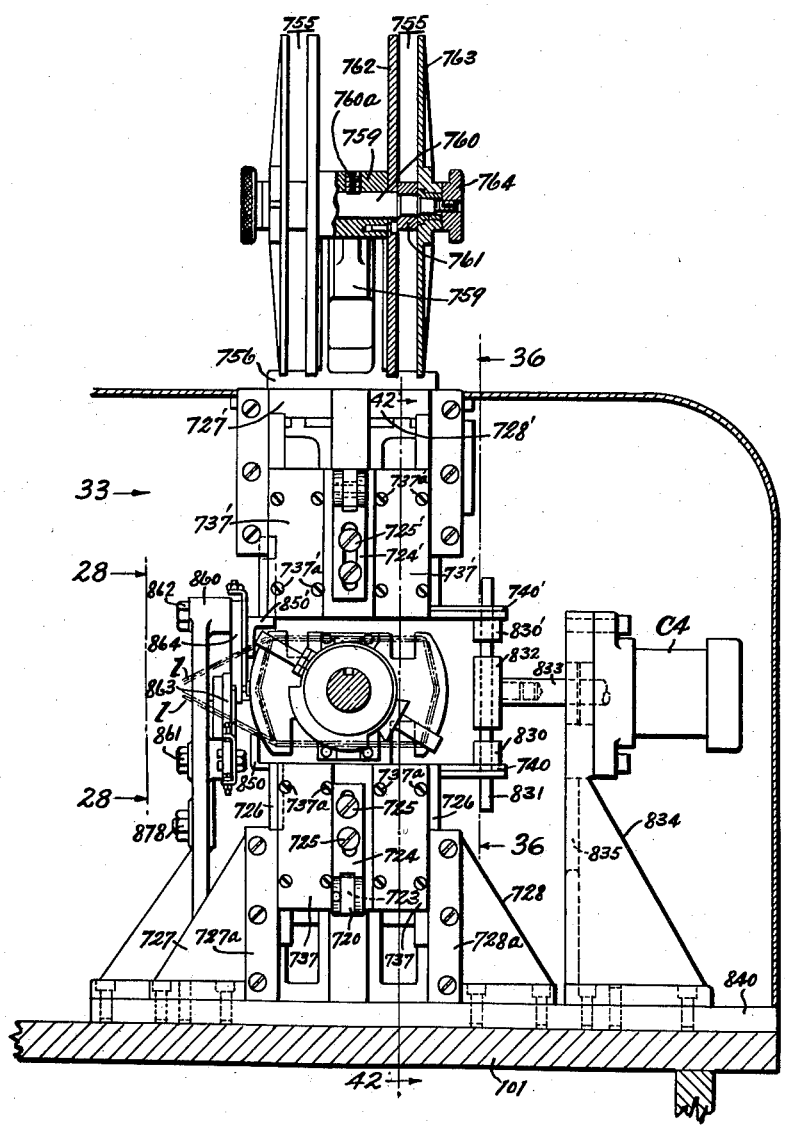

Fig. 27 is a front elevation of the coil taping apparatus.

Fig. 28 is a sectional view on line 28—28 of Fig. 27 and shows the coil spreading apparatus.

Fig. 29 is a diagram showing parts of Fig. 28 in other positions.

Fig. 30 is a view in the direction of arrow 30 of Fig. 28 of the coil spreading apparatus.

Figs. 31 and 32 are diagrams showing parts of Fig. 30 in other positions.

Figure 33:
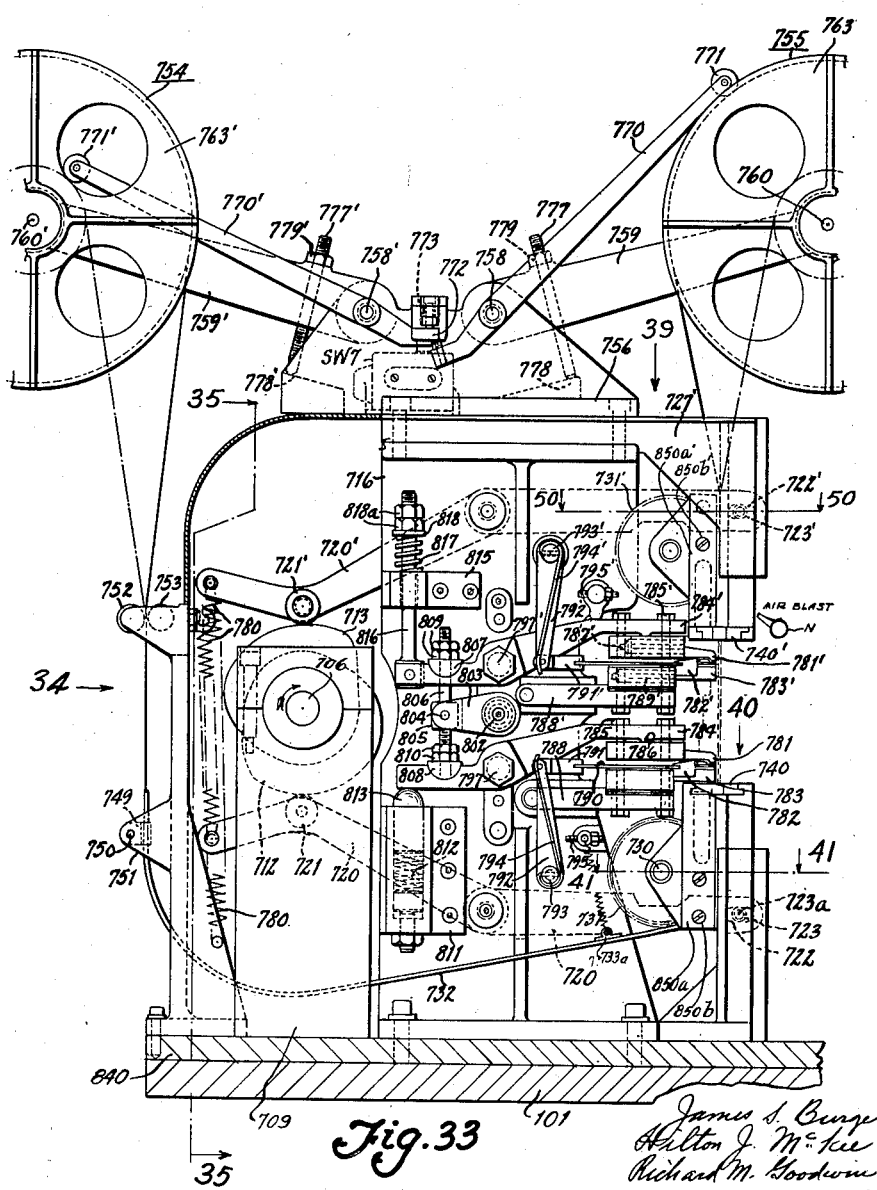

Fig. 33 is a side view of the coil taping apparatus looking in the direction of arrow 33 of Fig. 27.

Figure 34:
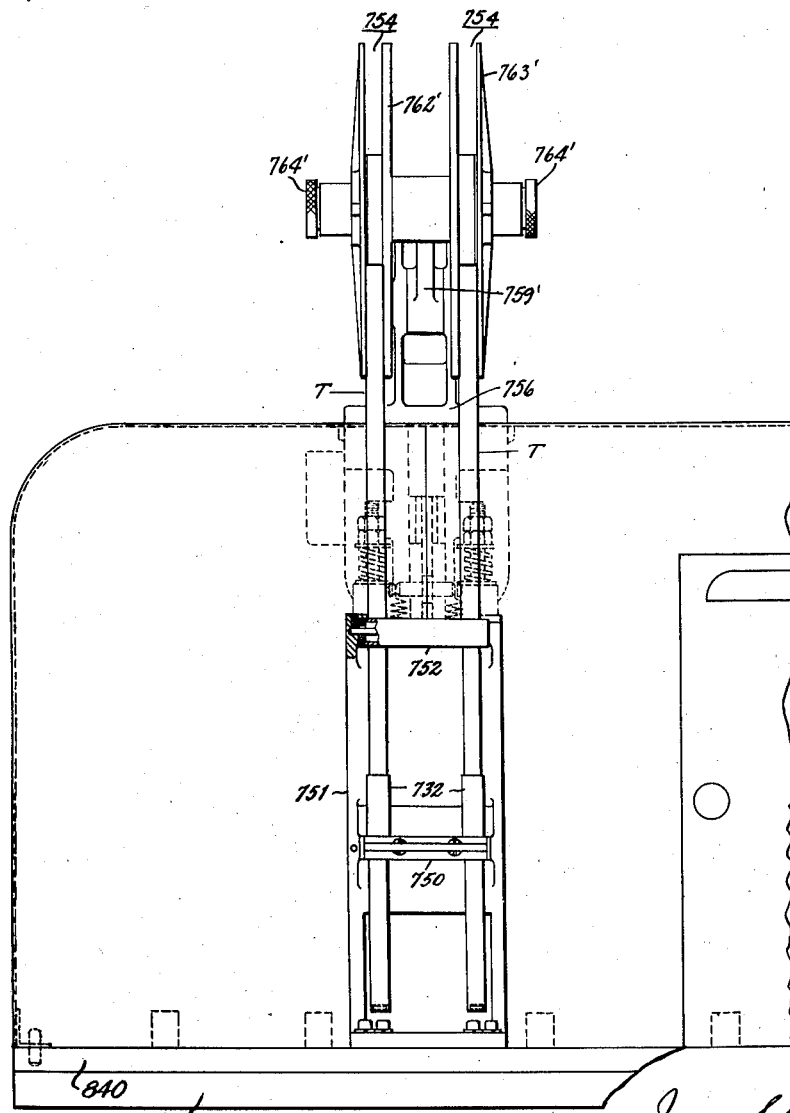

Fig. 34 is a rear view of the taping apparatus looking in the direction of arrow 34 of Fig. 33.

Fig. 35 is a sectional view on line 35—35 of Fig. 33.

Fig. 36 is a sectional view on line 36—36 of Fig. 27.

Figs. 37 and 38 are views taken respectively in the direction of arrows 37 and 38 of Fig. 36, and include sectional views taken generally on lines 37—37 and 38—38.

Fig. 39 is a plan view in the direction of arrow 39 of Fig. 33.

Fig. 40 is a fragmentary, plan view looking in the direction of arrow 40 of Fig. 33.

Fig. 41 is a fragmentary, sectional view on line 41—41 of Fig. 33.

Fig. 42 is a fragmentary, sectional view on line 42—42 of Fig. 27.

Figures 43, 44:
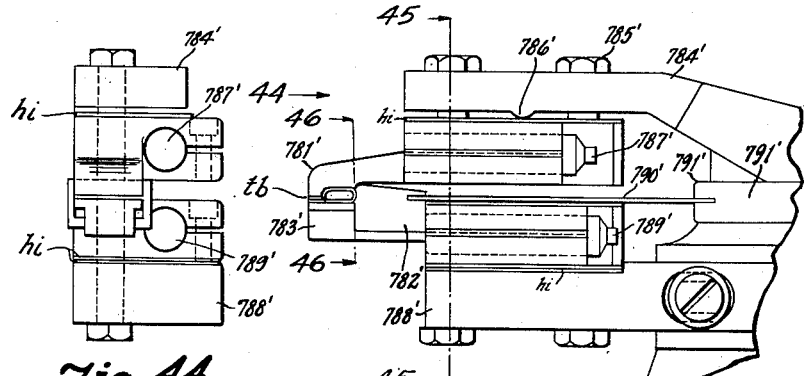

Fig. 43 is an enlarged side view showing the tape sealing parts shown in smaller scale in Fig. 36.

Fig. 44 is a view in the direction of arrow 44 of Fig. 43.

Figure 45:
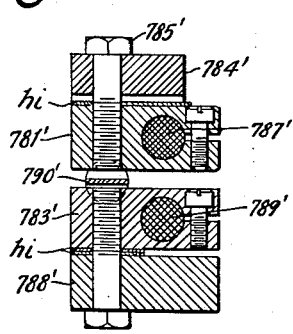

Fig. 45 is a sectional view on line 45—45 of Fig. 43.

Figure 46:
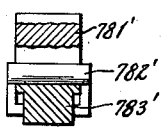

Fig. 46 is a sectional view on line 46—46 of Fig. 53.

Figure 47:
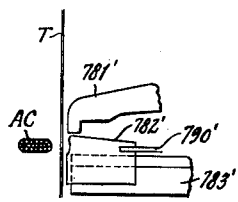
Figure 48:
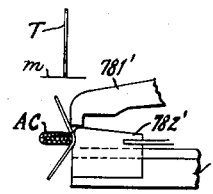
Figure 49:
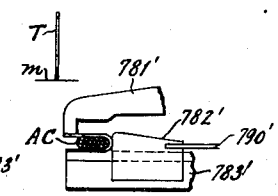

Figs. 47, 48 and 49 are diagrams showing operation of tape sealing members.

Fig. 50 is a plan view of a mechanism for applying a liquid to the portions of the coils to which tape is to be applied. This figure includes a sectional view on line 50—50 of Fig. 33.

Fig. 51 is an enlargement of parts located in dot-dash circle 51A of Fig. 50.

Fig. 52 is a sectional view on line 52—52 of Fig. 50.

Fig. 53 is a sectional view on line 53—53 of Fig. 50.

Fig. 54 is a front elevation of the mechanism for ejecting coils from the dial.

Fig. 55 is a fragmentary, sectional view on line 55—55 of Fig. 54.

Fig. 56 is a fragmentary view in the direction of arrow 56 of Fig. 54.

Figure 1:
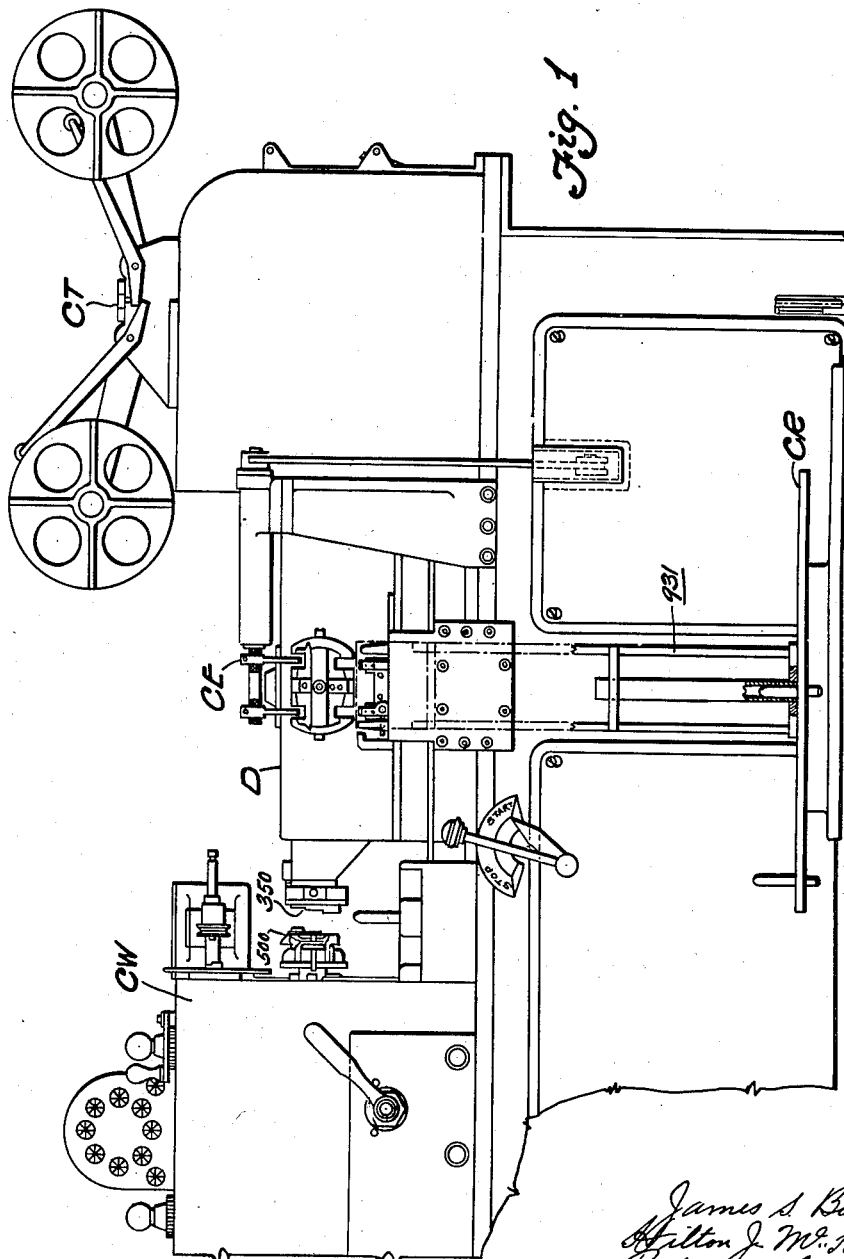
Fig. 1 is a fragmentary, front view of the machine.
Figure 2:
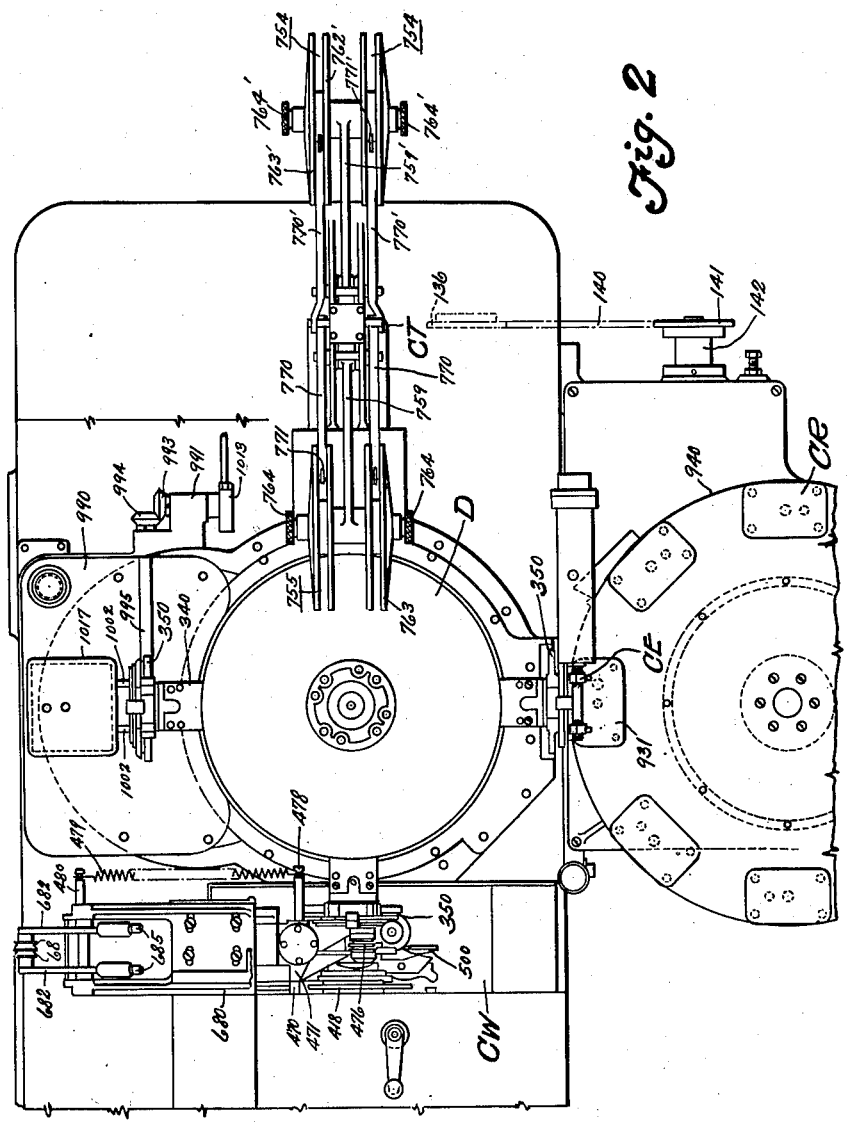
Fig. 2 is a fragmentary, top view of the machine.

In general, the machine comprises a rotating dial or turret D (Figs. 1 and 2) which carries a coil (wound by a winder CW) to a coil taping apparatus CT (Fig. 2) whereby the active coil sides of the coil are bound together by pieces of tape so that the coil will not become unwound, a coil ejecting apparatus CE (Fig. 2) which operates to remove a taped coil from a form carried by dial D, and a mechanism CR which moves intermittently a plurality of coil racks onto which the coils descend when they are ejected from a form carried by the dial D.

Referring to Fig. 23, a power driven shaft 118 is journaled in bearings supported by a frame 281 which is suspended from a table 101. Shaft 118 drives a worm 282 meshing with a worm gear 283 connected with a tubular shaft 284. Shaft 284 is connectible with a solid shaft 285 through a torque limiting clutch 286 and a one-revolution clutch II. The torque limiting clutch 286 comprises a driving disc 287 which is notched to receive plungers 288 which springs 289 urge radially inwardly. The plungers and springs are retained by screws 290 threaded into a driven disc 291. The disc 291 provides the driving element 240' of clutch II which is tripped automatically at the proper time by means disclosed in application S. N. 733,758 to connect element 240' with driven element 241' of clutch II, connected with shaft 285.

Shaft 285 is journaled in a bearing 300 carried by the frame 281 and in a bearing 301 provided by a plate 302 attached by screws 303 to a frame 304 attached to a plate 305 attached by screws 306 to the frame 281. The lower end of the shaft 285 is attached to a cam 307 engaged by a roller 308 on the stem 309 of the valve V6 for controlling a compressed air circuit described in S. N. 733,758.

The upper end of shaft 285 is connected by screws 310 and dowel pins 311 with the driving lever 312 of a Geneva gear shown in Figs. 27 and 26. Lever 312 carries a roller 313 for engaging radial slots 314 in a Geneva driven disc 315 having notches 316 for receiving a cylindrical surface 317 of the lever 312. Screws 315a attach the disc 315 to the hub 318 of a dial 319 (Fig. 23).

A fixed post 320 is supported by table 101 and has an extension 320a which is received by a bushing 321 attached to the table 101. The extension 320a is threadedly connected with a tie rod 322, the lower end of which is supported by the base 100. By turning the rod 322, when the lock nut 322a is loosened, any sag in the table 101, which supports considerable weight, can be eliminated. Between the post 320 and the hub 318 of dial 319, roller bearings 324 are located. To the hub 318 there is attached a frame 325 which carries the outer race of a ball bearing 326 spaced from the inner race of the upper roller bearing 324 by a sleeve 327. Nuts 328 threaded on the post 320 retain the ball and roller bearings in the positions shown in Fig. 23. A cover 329 is attached to frame 325 by screws 330.

The periphery of dial 319 is confined between a ledge not shown provided by a housing 332 and a plate 333 attached by screws threaded into holes 334 (Fig. 17) in said frame. Housing 332 has a flange 335 attached to the table by screws 336. In Fig. 17, the inside and outside contour of plate 333 is indicated by the dot-dash lines. The frame 332, the plate 333 and the dial 319 provide an enclosure for the Geneva gear.

The dial 319 provides four brackets 340 (Figs. 16 and 23) each having a bearing bushing 341 retained by cap 341a for receiving a shaft 342 which at its outer end as shown in Fig. 23 supports the dial winding form half 350 to be described. Each shaft 342 is moved axially by toggle mechanism comprising a link 371 and two links 372. Link 371 is supported by a pivot 373 supported by bracket 325. Links 372 are pivotally connected by their bosses 374 (Fig. 16) with a disc 375 retained on shaft 342 by a washer 376 and a nut 377 threaded on a screw 378 which secures form 350 to the shaft. The disc 375 carries a ball thrust bearing 379 for taking the thrust between the disc 375 and a shoulder 343 of shaft 342. Links 371 and 372 are connected by a pin 380 carried by a clevis 381 into which a rod 382 is threaded and is locked by a nut 382a. A spring 372a urges each pair of links 372 toward each other. When this spring is uncoupled, the links 372 can be easily separated from the pin 380 and the disc 375.

Rod 382 extends down through a bushing 382a carried by the dial 319 and has a head 383. Between the head 383 and a plate 384 attached to the hub 318 of dial 319 there is located a coil spring 385 which, being under compression, urges the rod 380 downwardly, thus breaking the toggle as shown in Fig. 23 so that the shaft 342 is drawn inwardly. Downward movement of clevis 381 is limited by engagement with screws 381a threaded into plate 384 and locked by nuts 381b. When the spring 385 is permitted to expand to retract the form 350, its part 346 does not bang against bracket 340 because screws 381a are adjusted so as to take the blow from the toggle clevis 381. The extent of approach of the form-half 350 to the form-half 500 (Fig. 1) of the winder is determined by the distance between the pivotal support 373 of link 371. To provide an adjustment, the support 373 is an eccentric portion of a rod 373a which is journaled in the bracket 325 and in a bushing 373b secured by a screw 373c (Fig. 16). Referring to Fig. 25, in relation to each rod 373a, the bracket 325 provides a hole 373d which receives a nut 373e and a sleeve 373f. A screw 373g passes through the sleeve 373f and threads into nut 373e. While screw 373g is loosened, the rod 373a is turned by a wrench applied to its squared end in order to obtain the desired clearance between adjacent parallel surfaces of forms 500 and 350 when the toggle is straightened. Then the screw 373g is tightened to clamp the rod 373 between the nut 373e and the sleeve 373f.

When the shaft 342 is drawn inwardly, it should not rotate; therefore a plate 344 which is a part of form 350 attached to the shaft 342 is caused to move inwardly and to bring its rib 345 into engagement with a notch 346 provided by the bracket 340 and the bearing cap 341a. However during the taping operation, the form 350 will be extended somewhat outwardly into a position wherein the plate 344 is out of engagement with the bracket 340. In order to prevent accidental rotation of the shaft 342 during its horizontal movement, it is provided with a groove 347 which receives a screw 348. When the toggle is straightened so that form 350 engages its companion piece 500 on the winding head, a groove 349 provided by the shaft will be brought into alignment with the screw 348 so that the shaft 342 may rotate freely.

The dial 319 is provided with four bushings 390, one of which is shown in Fig. 23. These bushings successively receive a dial locking rod (shown in application S. N. 733,758) when the dial 319 comes to rest after an intermittent movement by the Geneva gear. While the dial 319 is at rest, the locking rod is elevated automatically so that it moves into the bushing 390 so as to lock the dial while winding, moisturing, taping and ejecting operations are being performed, respectively, at four stations. Before the dial 319 is locked by the locking rod, it is held in location by a dog 319a (Fig. 17) urged by a spring 319b into a notch in one of four equally spaced wear pieces 319c attached to the dial. The dog 319a prevents bouncing of the dial due to speed of index.

While the dial 319 is at rest, that rod head 383 (Fig. 23) associated with the winding form 350 at the taping station is caused to rise by a mechanism shown in application S. N. 733,759. Therefore the winding form half 350 at the taping station is caused to move horizontally, radially outwardly and back again during the taping operation to be described. When a dial locking pin is being retracted from a dial bushing 390 (Fig. 23), rod head 383 is released so that spring 385 returns the winding form 350 to retracted position before the next indexing of the dial.

The dial half 350 of the form, will now be described with reference to Figs. 3 through 15.

The form 350 comprises a plate 351 having stepped surfaces A', B' and C' which match corresponding surfaces of the winding head half of the coil form 500. These stepped surfaces are provided with edge surfaces a', b', c', d', e', f', g' and h' which match with corresponding edge surfaces of form 500. The notches 351a of plate 351 provide for the reception of members which perform the coil taping operation, to be described. Plate 351 is attached to shaft 342 by screw 378, whose head is received by washer 352 which is seated in a counterbored portion 352a of plate 351. Dowel pins 353 locate the plate 351 relative to shaft 342. The disc 244 (Figs. 4 and 5) and a cam support 354 which surround the shaft 342 are attached to plate 351 by screws 355. The holes 355a in part 354 and the holes 355b in plate 351 receive the screws 355. Part 354 has a counterbored portion 354a for receiving a cylindrical boss 344a of disc 344. Part 354 provides a bearing portion which provides a cylindrical bearing portion 355b and a bearing portion 355c. A cam disc 356 surrounds the part 354 and is provided with cylindrical surfaces 356b, 356c and 356d engageable, respectively, with surfaces 355b, 355c and 355d of part 354. Part 356 provides a cam slot 357 (Figs. 11 and 15) receiving a pin 358 (Fig. 4) attached to a clamping jaw 359 retained by a plate 360 which screws 360a threaded into holes 360b of Fig. 6 attach to the plate 351. Part 356 provides a cam slot 361 (Figs. 11 and 13) which receives a pin 362 (Fig. 4) attached to a clamping jaw 363 retained by a plate 364, which screws 364a received by threaded holes 364b (Fig. 6) attach to plate 351. Plate 355 provides a cam slot 365 (Figs. 5 and 11) which receives a pin 366 attached to a clamping jaw 367 slidable in notch 367a of plate 351. Jaw 367 is provided with side flanges 367b (Fig. 3) received by recess 367c, the flanges being retained in these recesses by the cam disc 356 which in turn is retained by the cam disc support 354 when attached by screws 355 to plate 351.

Armature coil AC is shown in section in Fig. 4. It is clamped between jaws 363 and 367 which are caused to move respectively to the right and down when the cam disc 356 is rotated counterclockwise from the position shown in Fig. 5. During such movement, the lower part of the coil AC is released since jaw 359 moves to the right and downwardly in Fig. 4 and away from the fixed clamping jaw 368 attached by screws 368a to plate 351, said screws being received by tapped holes 368b (Fig. 6).

The cam disc 356 carries a pin 369 threaded into a tapped hole 369a (Figs. 11 and 12). Disc 356 carries a pin 370 integral with a plate 370a which screws 370b attach to the discs 356. The plate 370a provides a recess for receiving a ball 370c which a spring 370d within the pin 370 urges ball 370c toward the part 354 which is provided with three depressions 370e (Figs. 8 and 9) engaged by the ball 370c when the disc 356 is located in either of three positions. One of these positions corresponds to the location of the pins 369 and 370 horizontally as shown in Fig. 5 and effected by upward movement of bar 174 (Fig. 18) to place the jaws in neutral position preparatory to winding. Another of the positions corresponds to the location of the pins 369 and 370 as shown in Fig. 18, this position being effected by engagement of bar 193 with pin 370 for the purpose of unlocking the jaws preparatory to ejecting the coil. The other position of cam 356 is effected by the engagement of rod (located at the winder) with pin 369 to move it above the horizontal while pin 370 moves below the horizontal, in order to lock the coil in the form 350.

Fig. 4 shows the jaws 363, 367 and 359 in locking position. In order to move the jaws into locking position, rod 369 is moved up to 369' in Fig. 42. This movement takes place as a result of upward movement of rod 587 (Fig. 19) which is caused to move up following the winding of a coil. After winding the coil and locking thereof by the jaws, the wound coil is carried to the liquid applying apparatus and to the coil taping apparatus to be described. After the coil is taped, it is moved to the ejecting station. Before the removal of the coil from the dial-form 350, the jaws are moved to unlocked position by causing pin 370 to move up to the position shown in Fig. 42 as a result of upward movement of bar 193. When pin 370 is in this position, jaw 363 is moved to the right, jaw 366 is moved down and jaw 359 is moved to the right and down. The coil is then supported at the bottom side by jaw 359 and is free from fixed jaw 368. The top side of the coil is free to pass between jaws 367 and 363. Ejecting fingers to be described push the top side of the coil away from the dial-form 350 and it tilts about the jaw 359 as it gravitates from the form and descends upon a stacker. After ejection of the coil, the bar 174 (Fig. 42) goes up just far enough to cause the rods 369 and 370 to be located horizontally as shown in Fig. 27. This movement causes the jaw 366 to move up while the jaws 363 and 359 still remain in retracted position and away from the region of winding the wire upon the form. The form 350 is neither in locked nor unlocked condition but is in the neutral condition preparatory to advancing it to the winder-form 500. The jaws 367 and 368 have respectively upwardly and downwardly extending flanges which, during retraction of the dial-form 350 from the winder-form 500, drag the coil away from the winder-form. It is desirable that the upper jaw 367 be returned to upper position before winding a coil upon the combined forms 350 and 500. Hence neutralizing or return of jaw 367 takes place preferably before the form 350 is indexed to the winding station.

The coil taping apparatus will now be described with reference to Figs. 27 through 49. Referring to Fig. 35, a shaft 144 is caused to rotate one revolution at the proper time after the dial is indexed. Shaft 144 is journaled in a bearing 700 attached to a bracket 701 which supports a plate 702 supporting a thrust bearing 703 which takes the thrust from a bevel gear 704 attached to a shaft 144. Gear 704 drives a gear 705 attached to a cam shaft 706 journaled in a bearing 707 supported by bracket 701 and journaled in a bearing 708 supported by a bracket 709. Shaft 706 drives cams 710, 711, 712, 713 and 714, each of which can be made in diametrically separable parts to faciliate removal without removal of the shaft. (See construction of cam 714 in Fig. 28.)

Fig. 38 shows that table 100 supports two frames 715 and 716 tied together by a spacer 717 which supports a pin 718 passing through washers 719 and hub 720a of a lever 720. Referring to Fig. 33, lever 720 carries a roller 721 which engages cam 712. The right end of lever 720 has a slot 722 which receives a roller 723 carried by a pin 723a carried by a plate 724 (Fig. 27) having slots which receive screws 725 threaded into a slide 726 guided for vertical movement by brackets 727 and 728 to which plates 727a and 728a are attached to retain the slide 726.

Slide 726 supports a shaft 730 (Figs. 28, 40, 41 and 42) carrying gear wheels 731 to which tape is guided by flat tubes 732, each having an eye-clip 733a connected by a spring 733 with a stationary part (Fig. 33). As shown in Fig. 42 the tape passes around a quarter of wheel 731 and it is gripped by a gear 734 urged toward gear 731 by a spring 735 retained by an adjustable plug 735a and pressing against a lever 736 which carries the gear 734 and is pivotally supported on a pin 736a carried by a block 737 attached by screws 737a to slide 726. By pressing the lever 736 clockwise (Fig. 42), the gear 734 is separated from the gear 731 so that the tape, after passing from the end of tube 732, can be fed upwardly through a narrow passage between plates 738 and 739 which extend through a slot 740a in slide 740 (Fig. 40) which is horizontally moved. Slide 740 carries tape cutting blades 741 which are operated to cut off pieces of the tape of the desired length. Plate 739 is urged by a spring 739a toward plate 738. Spring 739a is supported by a screw 739b threaded through block 737 and adjusted to permit plate 739 to separate from plate 738 sufficiently to pass a spliced portion of the tape.

The feed wheels 731 are actuated counterclockwise (Fig. 42) or clockwise (Fig. 36) by mechanism comprising a ratchet wheel 742 attached to shaft 730 and engageable with a pawl 743 pivoted on a pin 744, passing through arms pivoted on a shaft 730 but not fixed thereto (Fig. 41). Pin 744 carries a roller 744a and is received by a notch 746 provided by a bracket 747 adjustably secured to a bracket 748 which is a part of frame 715. The operation of cam 712 upon a roller 721 (Fig. 33) causes slide 726 to move vertically. While the slide 726 is moving down from the position shown in Fig. 36, there will be relative rotation between the pawl 743 and ratchet 742 in a counterclockwise direction and no movement of ratchet 742 will take place. During upward movement of slide 726 to the position shown in Fig. 36, the arm 745 moves clockwise relative to the shaft 730 and the pawl 743 pulls the ratchet 742 in a clockwise direction in order to feed tape above the slide 740.

Two tapes are fed simultaneously through the frame 726. These tapes are fed through two tubes 732, each of which is shaped as shown in Fig. 33 with its right end supported by a stirrup 733 and its left end by a clip 749 pivotally supported at 750 by bracket 751 which supports rollers 752 and 753 between which the tape passes as shown in Fig. 34. The two tapes which pass through the tubes 732 are unwound from the two supply reels 754 (Fig. 34) in similar construction to tape reels 755 (Fig. 27) which supply the upper tape material. A bracket 756 (Fig. 33) which is supported upon a bracket 727', supported by frames 715 and 716, carries a rod 758 providing a fulcrum for a lever 759 supporting a rod 760 (Fig. 27) which is non-rotatable. Rod 760 attached by screws 760a to lever 759 supports a washer 761 upon which a tape roll is placed and is confined between a fixed plate 762 and a movable plate 763 retained by a nut 764 threaded on rod 760.

Pin 758 supports a lever 770 carrying a roller 771 for engaging the tape rolls. When the supply of tape on a roll is about exhausted the left end (Fig. 33) of lever 770 pushes upwardly on a bar 772 guided for vertical movement by bracket 756 and urged downwardly by spring 773. When the bar 772 is moved up against the action of spring 773, a switch SW7 closes and a signal lamp burns. In order that the lever 770 will be set into correct position the location of arm 759 is determined by screw 777 threaded to arm 759 and engageable with a stop 778 provided by bracket 756, the screw 777 being retained in adjusted position by lock nut 779. Reels 754 are associated with parts similar to parts associated with reels 755, the former being indicated by the reference numerals of the latter with a prime affixed.

The description of slide 726 and the means for operating it through the action of cam 712 and the means for feeding two tapes through it by the action of a ratchet and pawl mechanism and the supply of tapes thereto from the two rear reels 754 applies as well to the feeding of the tape from the two forward reels 755 through an upper slide 726' corresponding to slide 726. Therefore, the parts are referred to by the same reference numbers with a prime affixed. The upper frame 726' is guided vertically by brackets 757 attached to frames 715 and 716. The cross slide 740' carried by it carries knives corresponding to 741 which cut off the upper tapes. The upper tapes are not guided by tubes 732 as are the lower tapes, but the upper tapes pass directly to the feed rolls 731' (Fig. 50). A sectional view through one of the upper feed rolls 731' is shown in Fig. 42. When upper slide 726' moves down the ratchet 742' is rotated counterclockwise so that tape is fed below the cross slide 740'. A pawl 768 (Fig. 36) on a spring blade 769 prevents clockwise rotation of ratchet 742' when slide 726' moves up. Slide 726' is caused to move up and down by lever 720' having roller 721' engageable with cam 713. The rollers 721 and 721' are retained in engagement with their respective cams by spring 780 connected with levers (Fig. 33).

There are four sets of tape applying irons. The irons of the two lower sets are marked, respectively, 781, 782, 783 (Fig. 33), and the irons of the two upper sets are marked, respectively, 781', 782', 783'. One set of the latter is shown in Figs. 43 to 49. Each upper iron 781' is attached to a lever 784' by screws 785' which adjust it relative to a fulcrum 786'. Each upper iron 781' is heated by an electrical heating unit 787'. Each iron 783' is supported by a horizontally adjustable bar 788' and is heated by a unit 789'. Each iron 782' provides a tape-gripping pressure pad and is biased toward the coil to be taped by a supporting blade 790' attached to a lever 791' carried by a lever 792' pivotally supported by a stud 793' and urged toward the right (Fig. 33) by a spring 794' until it engages a stop-screw 795'. The lower sets of irons are supported and heated in a similar manner, the same reference numbers being applied to corresponding parts without a prime affixed. The heated irons are thermally insulated from their supports by heat insulating strips hi. As heat from the irons rises, cooling air issuing from a nozzle N (Fig. 33) is directed against the parts surrounding the upper tapes so that the coating thereon will not become tacky before the tape is fed down, cut off and applied to the coil.

Levers 784 and 784' are pivoted on studs 797 and 797' respectively. There they are caused to advance toward each other or to retract from each other by the cam 711 (Fig. 35) which engages a roller 800 carried by a lever 801 attached to a shaft 802 attached to a lever 803 carrying a pin 804 (Fig. 33) passing through a block 805 on a rod 806 passing through semi-cylindrical blocks 807 and 808 and threadedly engaging parts of nuts 809 and 810. Blocks 807 and 808 are received by semi-cylindrical notches in lever 784' and 784 respectively. A bracket 811 contains a spring 812 which urges a plunger 813 against lever 784 and the latter against the block 808. A bracket 815 guides a rod 816 attached to lever 784' and retains a spring 817 pressing upwardly against a washer 818 and the latter against a pair of nuts 818a threaded on rod 816, thereby urging lever 784' clockwise against block 807. By adjusting nuts 609 and 810 along rod 806, the normal position of irons 781' and 781 is adjusted. The irons 781' and 781 are caused to approach or retract from irons 783' and 783 respectively by the operation of cam 711 upon roller 800, said roller being biased toward said cam by springs 812 and 817.

Fig. 38 shows shaft 802 journaled in a bearing 820 supported by frames 715, 716. Lever 803 (on right of Fig. 38) is retained by washer 821 and a screw 822. Lever 801 which retains lever 803 (on left of Fig. 38) is retained in a similar manner.

The sequence of operations of the irons is shown in Figs. 47, 48, 49 and 43. Tape T, which is cloth coated with a thermoplastic adhesive, said coating facing the coil AC, hangs down in front of the irons in Fig. 47. While it is being severed at line m (Fig. 48) armature coil AC moves right to press the severed tape piece against iron 782' and the tape piece is held against the right edge of the coil. Coil AC moves again to the right into the position shown in Fig. 49 causing the tape piece to be formed against the upper and lower sides of the coil, the iron 782' being pushed right by the coil (left in Fig. 33) against the resistance of spring 794'. Then the iron 781' is caused to move into the position shown in Fig. 43 to seal the tape ends together and against the coil. Thus a tab tb of double thickness is formed of tightly adhering tape portions, since the coated portions of the tape face each other. The tab tb extends from an edge of the coil and there is no double thickness of tape at the side layers of the coil. This construction is desirable particularly if the coil is to be inserted in armature core slots lined with insulation and only wide enough to receive the taped coil. A double thickness of tape alongside the coil would interfere with insertion of the coil into core slots. Then the irons return to normal position shown in Fig. 47 and the coil is retracted and the dial indexes to carry the taped coil to the ejecting station. The mode of operation of the other sets of irons is the same as described.

Bars 740, 740' (Fig. 27) which carry the tape-cutting blades 741, 741' (see Fig. 40 for blades 741) are provided with tubular bosses 830, 830' respectively, which receive a rod 831 attached to a T 832 attached to a piston rod 833 connected with a piston within cylinder C4 supported by a bracket 834 having a hole 835 through which slide 740 can be passed for disassembly while slide 726 is down. Admission of fluid pressure to cylinder C4 is controlled by a valve V19 (Fig. 35) supported on a bracket 836 and operated by cam 710. Operation of the blades by compressed air is satisfactory as quick movement is desired.

A plate 840 attached to table 101 carries the taping mechanism to form a separate sub-assembly.

The coil before taping is shown diagrammatically in Fig. 31, the gripping members of form 350 engage its mid-portions as indicated at g. The coil leads l tend to spread away from the coil turns. Before tape is applied at portions h—k, the leads l are caused to lie against the coil as shown in Fig. 32 by bars 850 and 850', carried, respectively, by slides 726 and 726'. Each slide has on its left side (Figs. 30 and 28) a groove 851 receiving the shank 852 of a bar, said shank having a slot 853 receiving a pin 854 attached to the slide. A spring 855, located in the groove 851 urges the upper end of the shank slot against the pin. Therefore, when the slides 726 and 726' are fully advanced as shown in Fig. 29, the coil leads will be pushed toward each other by yielding pressure of the spring 855, and will be held against the coil turns during taping. As bar 850' retracts upwardly, the inclined surfaces 857 of its lug 856 rubs against one of the upper coil leads and causes it to be dragged above the other upper lead and pushed to the right (Fig. 29) above said other coil lead. After the surface 857 has passed the lead which it had dragged upwardly, said lead springs into a position to the right of said other upper lead. In this way, the two upper leads exchange location relative to the coil turns. This saves an operation later to be performed manually when connecting the armature coil leads with commutator bars.

After the taping operation, the coil leads l may be left in too closely converging relation. It is desirable to spread them while the coil is still gripped by the taping irons in order that they will remain more nearly in horizontal position before the coil passes to the ejecting station. This is effected by the apparatus shown in Figs. 28 and 30. A bracket 860 supported by plate 840 carries screws 861 and 862 supporting bell crank levers 863 and 864 respectively which carry screws 865 and 866 respectively supporting arms 867 and 868 respectively, provided with yokes 869 and 870 respectively. Each of these yokes supports screws 871 fixed in location by lock nuts 872. By adjusting the screws 871 the location of the arms with respect to the bell crank levers can be adjusted. Spreading of the coil leads is effected by cam 714 which engages a roller 875 pivoted on a pin 876 attached to a lever 877, pivoted on a screw 878 carried by a bracket 860. Lever 877 carries a pin 879 received by slots 880 in each of the levers 863 and 864. Roller 875 is maintained in engagement with cam 714 by spring 881 attached to bracket 860 and to a screw 882 fastened to lever 877. When the coil to be taped has been brought into the taping station and has been advanced toward the taping apparatus, the arms 867, 868 are in positions 867', 868'. After retraction of the slides 726, 726', these arms move to the full positions to spread the coil leads while the sealing irons still retain grip on the coil, otherwise the tape which is still hot would be pulled away from the coil.

After taping, the coil moves to the ejecting station. Before the coil can be ejected, the arm 370 (Fig. 5) must be moved up, or clockwise (Fig. 18). This is accomplished by upward movement of bar 193. After unlocking the coil, it is ejected from the form 350 by fingers 900 (Figs. 54 and 55) operated by shaft 901 journaled in bearings supported by housing 902 carried by bracket 903. Shaft 901 is connected by arm 904 with link 187. Shaft 184, carrying arm 183 connected by a link 182 with lever 181 operated by a power driven cam 153, is connected through torque-limiting clutch parts 905—906 (Fig. 54) urged together by a spring 907 with a shaft 908 held in alignment with a shaft 184 by a bearing in part 905 and by a bracket 909. If ejection of the coil is abnormally resisted, the clutch part 906 will move right (Fig. 54) against the resistance of spring 907 thus disconnecting shaft 908 from shaft 184 and also effecting engagement by the flange 911 of clutch part 106 with a switch SW6 which is described in Serial No. 733,758 and causes the machine to stop.

After the coil is ejected the form-half 350 is restored to neutral condition by movement of its arms 369—370 to horizontal position as shown in Fig. 5, this being effected by upward movement of bar 174.

Referring to Fig. 18, the upward movement of bar 193 is used also to operate means for pushing upwardly the tab formed by the sealed ends of the lower tape piece 912 at 910. While these sealed ends are still warm and the sealing compound is somewhat soft, the inclined surfaces 913 of spring 914 move against the sealed ends and cause them to be bent upwardly. The fingers 913 are clamped at their lower ends between a plate 915 and a frame 916 having inclined surfaces which permit movement of fingers 914. Screw 917 attach plate 915 to the frame 916 which, as shown in Fig. 21, is provided with grooves 919 for receiving the fingers 913; and pins 918 pressed to the frame 916 are received by holes in fingers 913.

The frame 916 is guided by a vertical groove 920 in plate 175 which guides the bars 193 and 174 which together with frame 916 are retained by a cover plate 175a (Fig. 5). Frame 916 carries a pin 921 providing a pivot for a hub 922 (Fig. 21) from which extend two integral levers 923 and 924. These levers are urged clockwise (Fig. 19) by a plunger 925 urged left by a spring 926 retained by the frame 916. When the bar 193 is down as shown in Fig. 19, a shoulder 927 thereof receives the lower end of lever 923. Consequently, frame 916 is caused to move upwardly with bar 193 a distance sufficient to cause the spring fingers 913 to bend the sealed tape ends. As the frame 916 approaches the end of its upward movement, the lever 924 engages a bar 928 adjustably attached to the plate 175. At the end of the upward movement of frame 916, the levers 924 and 923 are caused to move into the position shown in Fig. 20, thereby disconnecting the frame 916 from the bar 913 so that the frame 916 gravitates to the position shown in Fig. 18. When bar 193 returns to its lower position, its shoulder 927 is located just below the lower end of lever 923 which is urged by spring 926 shown in Fig. 19.

The ejected coils fall around a rack 934 (Fig. 1) which is one of eight racks supported by a dial 940 which is indexed after a predetermined number of ejection operations sufficient to fill one rack. The indexing mechanism is described in Serial No. 733,758.

The sticking of tape pieces to the coil can be improved if the tape-receiving portions of the coil AC (on form 350, Fig. 53) are first moistened with a liquid which tends to make the plastic coating of the tape slightly tacky. Such liquid is contained in a tank 990 (Fig. 51) supported by the table 101 and provided with a bracket 991 supporting a shaft 992 driving a miter gear 993 meshing with a miter gear 994 connected with a shaft 995 supported by brackets 996 and 997 provided by the tank 970. Shaft 995 operates a lever 998 (Figs. 52 and 53) carrying sleeves 999, each receiving a rod 1000 secured in adjusted position by a screw 1001. Each rod 1000 carries a tube 1002 which serves as a dipper. When lever 998 is in position 998', the tube 1002 receives liquid from the tank 970. When the lever moves to the full line position 998, the liquid flows from the tubes 1002 and drips upon the tape-receiving portions of the coil. Movement of the lever 998 is effected by the cam 1005 driven by the shaft 706 and cooperating with a roller 1006 pivotally supported by a pin 1007 carried by a lever 1008 pivoted at 1009 on a block 1010. Pin 1007 passes through a clevis 1011 connected by a turnbuckle rod 1012 with a clevis 1013 pivotally connected with an arm 1014 connected with shaft 992. A spring 1015 connecting clevis 1013 with a screw 1016 on bracket 709 urges the roller 1006 against the cam 1005. Rotation of the cam effects movement of lever 998 to cause application of liquid to the coil while it is at a station between the winding station and the taping station. A shield 1017 supported by the tank 990 encloses the lever 998 and is provided with openings through which the tubes 982 pass. Fig. 50 shows a tube 990a supported by a float (not shown) in the tank 990. This tube indicates the liquid level in the tank and provides a duct through which liquid is passed into the tank.

While the embodiment of the present invention as herein disclosed, constitutes a preferred form, it is to be understood that other forms might be adopted.

What is claimed is as follows:

1. A machine for taping electrical coils having layers of coil turns comprising a conveyor having a plurality of coil receiving forms which it successively moves to a taping station, means for intermittently moving the conveyor, means at the taping station for feeding tape having on one side thereof a heat-softenable adhesive coating and for locating the tape with coated side adjacent the coil on the form, means for causing a portion of the tape spaced from its end to be pressed against one side of the coil, means for severing the tape portion so pressed from the tape supply leaving tape portions extending oppositely from the tape portion pressed against the coil, the severed portion of tape having length such that the oppositely extending end portions of the tape have length in excess of the width of the coil and means for causing the oppositely extending tape portions to be wrapped around the coil and heated to secure adherence thereof to the outer and inner turn layers of the coil and to cause the excess of tape portions to be pressed together to form a tab of double thickness projecting from an edge of the coil.

2. A machine for taping electrical coils of rectangular formation and having layers of coil turns from which leads extend in spaced relation, said machine comprising a conveyor having a plurality of coil receiving forms which it successively moves to a taping station, means for intermittently moving the conveyor, means at the taping station for feeding tape to be applied to the coil, means for severing from the supply the length of tape required for a coil wrapping, means for wrapping the length of tape about the coil and causing it to adhere, means operating in advance of the taping operation for pressing the leads toward each other to press the coil turns, from which the leads directly extend, against the other coil turns.

3. A machine for taping electrical coils having layers of coil turns comprising a conveyor carrying a plurality of coil receiving forms which it successively moves to a taping station, means for intermittently moving the conveyor, means at the taping station for feeding tape having a heat-softenable-plastic coating on one side thereof and for locating the tape with coated side adjacent the coil, a heated member, means for effecting relative movement between the coil and member to cause a portion of the tape spaced from its ends to be clamped between the coil and the member and to be heated thereby so that said portion adheres to the coil, means for severing the tape portion so clamped from the tape supply leaving portions extending oppositely from the clamped portion, the severed portion of tape having length such that the oppositely extending end portions of the tape have length in excess of the width of the coil and heated members for causing the oppositely extending portions of the tape to engage respectively the outer and inner coil turn layers and the ends thereof to be pressed together and heated to secure adherence thereof to the outer and inner turn layers of the coil and to cause the excess of tape portions to be pressed together to form a tab of double thickness projecting from an edge of the coil.

4. A machine for taping electrical coils having layers of coil turns comprising a conveyor carrying a plurality of coil receiving forms successively moved by the conveyor to a taping station, means provided by the conveyor for supporting each coil form for lateral movement edgewise of the coil, means for intermittently moving the conveyor, means at the taping station for feeding tape having a heat-softenable-plastic coating on one side thereof, and for locating the tape with coated side adjacent the coil, two heated jaws normally spaced apart, a heated pressure pad located between the jaws and normally located slightly in advance of the jaws relative to the coil, means for moving the coil form laterally from fully retracted to two advanced positions, first to cause the coil thereon to engage a portion of the tape spaced from its end and to push the same against the pressure pad, means for severing from the supply the tape portion pressed by the pad against the coil, leaving portions extending oppositely from the pressed portion, the severed portion of the tape having length such that the oppositely extending end portions of the tape have length in excess of the width of the coil, said coil moving means then moving to the second advanced position and moving the pressure pad with it whereby the oppositely extending portions of the tape are caused by the heated jaws to be located respectively adjacent the outer and inner coil turn layers, the tape ends extending beyond the coil, and means for causing the jaws to approach each other to clamp the tape ends between them and to heat the tape ends to cause them to adhere to form a tab of double thickness projecting from an edge of the coil.

5. A machine for taping electrical coils having layers of coil turns comprising a conveyor, a plurality of coil receiving forms supported by the conveyor for lateral movement, means for indexing the conveyor to locate the conveyor forms successively at a taping station, a taping mechanism at the taping station, devices carried by the conveyor and each connected with a coil form and operable to advance and retract the coil form to the taping mechanism when at the taping station, means for operating the coil form shifting device located at the taping station to advance the coil toward the taping mechanism during the taping operation and to retract the coil after the taping operation, said taping mechanism including two normally spaced, heated tape applying members between which the coil is moved when advanced at the taping station, a heated tape pressure pad between the tape applying members, means for positioning tape between the coil and the pressure pad members, advancement of the coil at the taping station causing the mid-portion of the tape to be clamped between the coil and the pressure pad and the oppositely extending end portions of the tape to be located around alongside the coil as said coil, tape and pressure pad move together between the first two members and means for causing said first two members to approach to effect adherence of the tape to the outer and inner coil turn layers and then to retract while the coil is fully advanced toward the taping mechanism, said first mentioned tape applying members having cooperating surfaces in closely spaced relation when said members are brought together to cause the tape ends to be squeezed together and to adhere to form a tab of double thickness extending from an edge of the coil.

6. Apparatus for taping electrical coils having coil turn layers comprising a coil holder, a pressure pad for pressing against the coil the intermediate portion of a piece of adhesive coated tape, tape folding and tape sealing irons normally separated, means for effecting relative movement of the coil, tape piece and pressure pad with respect to the separated irons to cause the other portions of the tape to be located respectively alongside the outer and inner coil turn layers, and means for causing the irons to move toward each other to press other portions of the tape against the outer and inner coil turn layers and to cause the tape ends to be pressed together to form a tab of double thickness, said irons having cooperating surfaces which are in closely spaced relation while other parts of the irons press the tape against said layers of the coil.

7. Apparatus for taping electrical coils comprising a coil holder, a pressure pad, means for feeding adhesive coated tape adjacent to the portion of the coil to be taped and between the coil and the pad, means for moving the coil first to engage the tape and to press the coil and the tape against the pad, means for severing the tape from the supply, normally separated tape folding and sealing irons, said coil moving means having a second movement which causes the coil, severed tape piece and the pressure pad to move together between the irons, thereby causing the tape to be located alongside the coil, said irons having cooperating surfaces for engagement of the tape to press it against the outer and inner coil turn layers and cooperating surfaces for pressing together end portions of the tape, means for causing relative movement between the irons in order to press the tape against the coil layers and to cause the tape ends to be squeezed together to form a tab of double thickness projecting from an edge of the coil, and mechanism for causing all of said means to operate in timed relation.

8. Apparatus according to claim 7 in which the means which causes the tape sealing irons to move toward each other includes springs which cause the irons to approach and mechanical devices which cause the irons to retract against spring force.

9. Apparatus for making electrical coils comprising a conveyor having coil holders, means for moving the conveyor intermittently to locate the coils successively at coil taping and coil ejecting stations, means at the taping station for applying to the coil, a piece of adhesive coated tape and for causing it to be folded around the coil and the ends thereof which extend from the coil to be sealed together to form a double thickness tab projecting from an edge of the coil, means at the ejecting station to bend the tape tab, means at the ejecting station for removing the taped coil from the holder, and mechanism for causing operation of all of said means in timed relation.

10. Apparatus for making taped electrical coils comprising a conveyor having coil holders, means for moving the conveyor intermittently to locate the coils successively at coil moistening and coil taping stations, means at the coil moistening station for applying to the coil a liquid which facilitates adherence to the coil of adhesive coated tape to be applied at the taping station, means at the taping station for applying to the coil, a piece of adhesive coated tape and for causing it to be folded around the coil and the ends of the tape to be sealed together and mechanism for causing operation of all of said means in timed relation.

11. A machine for taping electrical coils having layers of coil turns comprising a coil holder having a form with which the inner layers of coil turns are in contact and means for securing the coil to the form, means for feeding tape having on one side thereof a heat-softenable adhesive coating and for locating the tape with coated side adjacent to one edge portion of the coil, a heated iron for engaging a portion of the tape spaced from its free end and for holding said portion against an edge portion of the coil, means for severing the tape, while so held from the tape supply, thus leaving tape end portions extending oppositely from the intermediate tape portion held by the iron against a coil, said tape end portions being longer than the width of the layers of coil turns, heated irons for engaging the end portions of the tape to cause them to be positioned respectively adjacent to outer and inner coil turn layers, means for causing one of the second mentioned irons to advance toward the other one to press the tape end portions against outer and inner coil turn layers, said one of the second mentioned irons having a portion which moves into close relation to the other one whereby the ends of the tape are pressed together and are sealed thus providing a tab of double tape thickness at the edge of the coil remote from the edge against which an intermediate portion of the tape is held by the first iron, and means for effecting relative movement, edgewise of the coil, between the coil and irons to cause the first iron to hold said intermediate tape portion against a coil edge and then to cause the other irons to position the tape end portions alongside the outside and inside coil turn layers.

12. A machine for taping electrical coils having layers of coil turns comprising a coil holder having a form with which the inner layers of coil turns are in contact and means for securing the coil to the form, means for moving the holder edgewise of the coil, means for feeding tape having on one side thereof a heat-softenable adhesive coating and for locating the tape with coated side adjacent to one edge portion of the coil, a heated iron against which the coil presses the intermediate portion of the tape in consequence of said movement of the holder, a spring resisting movement of the iron and the coil and tape together, means for severing the tape, while so held from the tape supply, thus leaving tape end portions extending oppositely from the intermediate tape portion held by the iron against a coil, said tape end portions being longer than the width of the layers of coil turns, a pair of heated irons spaced by the first iron and engageable with the tape end portions during further movement of the holder, to position said tape end portions respectively adjacent to the outer and inner coil turn layers, and means for causing one of the second mentioned irons to advance toward the other one to press the tape end portions against outer and inner coil turn layers, said one of the second mentioned irons having a portion which moves into close relation to the other one whereby the ends of the tape are pressed together and are sealed thus providing a tab of double tape thickness at the edge of the coil remote from the edge against which an intermediate portion of the tape is held by the first iron.

13. A machine for taping electrical coils having layers of coil turns comprising a conveyor, a plurality of coil holders carried by the conveyor, each holder having a form with which the inner layers of coil turns are in contact and means for securing the coil to the form, means for indexing the conveyor to locate the holders in succession at receiving, taping and unloading stations, means for operating the coil securing means of a holder, while at the receiving station, to lock the coil to the holder, means for operating the coil securing means of a holder, while at the unloading station, to unlock the coil to permit removal from the holder, means for moving a holder, while at the taping station, edgewise of the coil, means for feeding tape having on one side thereof a heat-softenable adhesive coating and for locating the tape with coated side adjacent to one edge portion of the coil, a heated iron against which the coil presses the intermediate portion of the tape in consequence of said movement of the holder, a spring resisting movement of the iron and the coil and tape together, means for severing the tape, while so held from the tape supply, thus leaving tape end portions extending oppositely from the intermediate tape portion held by the iron against a coil, said tape end portions being longer than the width of the layers of coil turns, a pair of heated irons spaced by the first iron and engageable with the tape end portions during further movement of the holder, to position said tape end portions respectively adjacent to the outer and inner coil turn layers, means for causing one of the second mentioned irons to advance toward the other one to press the tape end portions against outer and inner coil turn layers, said one of the second mentioned irons having a portion which moves into close relation to the other one whereby the ends of the tape are pressed together and are sealed thus providing a tab of double tape thickness at the edge of the coil remote from the edge against which an intermediate portion of the tape is held by the first iron and a mechanism for effecting operation of the operating means in sequence.

14. A machine for taping electrical coils having layers of coil turns comprising a conveyor, a plurality of coil holders carried by the conveyor each holder having a form with which the inner layers of coil turns are in contact and means for securing the coil to the form, means for indexing the conveyor to locate the holders in succession at receiving, taping and unloading stations, means for operating the coil securing means of a holder, while at the receiving station, to lock the coil to the holder, means for operating the coil securing means of a holder, while at the unloading station, to unlock the coil to permit removal from the holder, means for moving a holder while at the taping station, edgewise of the coil, means for feeding tape having on one side thereof a heat-softenable adhesive coating and for locating the tape with coated side adjacent to one edge portion of the coil, a heated iron against which the coil presses the intermediate portion of the tape in consequence of said movement of the holder, a spring resisting movement of the iron and the coil and tape together, means for severing the tape, while so held from the tape supply, thus leaving tape end portions extending oppositely from the intermediate tape portion held by the iron against a coil, said tape end portions being longer than the width of the layers of coil turns, a pair of heated irons spaced by the first iron and engageable with the tape end portions during further movement of the holder, to position said tape end portions respectively adjacent to the outer and inner coil turn layers, means for causing one of the second mentioned irons to advance toward the other one to press the tape end portions against outer and inner coil turn layers, said one of the second mentioned irons having a portion which moves into close relation to the other one whereby the ends of the tape are pressed together and are sealed thus providing a tab of double tape thickness at the edge of the coil remote from the edge against which an intermediate portion of the tape is held by the first iron, means at the unloading station for bending the tape tab before the coil is unlocked from the holder, and a mechanism for effecting operation of the operating means in sequence.

JAMES S. BURGE.
HILTON J. McKEE.
RICHARD M. GOODWIN.

REFERENCES CITED

The following references are of record in the file of this patent:

UNITED STATES PATENTS

| Number | Name | Date |
| --- | --- | --- |
| 2,094,815 | Poole | Oct. 5, 1937 |
| 2,228,950 | Flood | Jan. 14, 1941 |
| 2,307,976 | Walz | Jan. 12, 1943 |
| 2,486,832 | Ferguson | Nov. 1, 1949 |